US012488727B2

(12) United States Patent
Lin et al.

(10) Patent No.: US 12,488,727 B2
(45) Date of Patent: Dec. 2, 2025

(54) GATE DRIVING DEVICE AND OPERATING METHOD FOR GATE DRIVING DEVICE

(71) Applicant: HIMAX TECHNOLOGIES LIMITED, Tainan (TW)

(72) Inventors: Yen-Hua Lin, Tainan (TW); Chuan-Chien Hsu, Tainan (TW); Han-Shui Hsueh, Tainan (TW); Wei-Hong Du, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/880,590

(22) Filed: Aug. 3, 2022

(65) Prior Publication Data

US 2024/0054937 A1 Feb. 15, 2024

(51) Int. Cl.
*G09G 3/20* (2006.01)
*G09G 3/36* (2006.01)

(52) U.S. Cl.
CPC ......... *G09G 3/2092* (2013.01); *G09G 3/3674* (2013.01); *G09G 2310/0267* (2013.01); *G09G 2310/0286* (2013.01); *G09G 2310/08* (2013.01)

(58) Field of Classification Search
None
See application file for complete search history.

(56) References Cited

U.S. PATENT DOCUMENTS

2005/0168425 A1* 8/2005 Takada ................. G09G 3/3614 345/94
2007/0229433 A1* 10/2007 Jang ..................... G09G 3/3677 345/96
2018/0182300 A1 6/2018 Chen et al.
2018/0197478 A1* 7/2018 Wang ................... G09G 3/3266
2019/0139617 A1* 5/2019 Sasaki .................. G09G 3/3677
2020/0342799 A1* 10/2020 Yang ................. H01L 27/14812
2021/0375226 A1 12/2021 Fujihara et al.
2022/0093024 A1* 3/2022 Zheng ...................... G09G 3/20
2022/0165195 A1 5/2022 Lee et al.
2022/0230573 A1* 7/2022 Nakagawa ........... G09G 3/3266
2022/0301494 A1* 9/2022 Vigier ...................... G09G 3/32

FOREIGN PATENT DOCUMENTS

CN 102456330 5/2012
CN 104978944 10/2015
CN 106097971 11/2016
CN 109697966 A * 4/2019
TW 201019306 5/2010

OTHER PUBLICATIONS

"Office Action of Taiwan Counterpart Application", issued on Nov. 21, 2023, p. 1-p. 4.
"Office Action of Taiwan Counterpart Application", issued on May 2, 2024, p. 1-p. 7.

* cited by examiner

*Primary Examiner* — Temesghen Ghebretinsae
(74) *Attorney, Agent, or Firm* — JCIPRNET

(57) ABSTRACT

A gate driving device and an operating method are provided. The gate driving device includes a plurality of gate driving circuits and a control circuit. The gate driving circuits generate a plurality of gate driving signals having different timing. The control circuit is coupled to a plurality of candidate gate driving circuits among the gate driving circuits. The control circuit selects one of the candidate gate driving circuits as an initial stage gate driving circuit per one scanning cycle. A series connection mode between the gate driving circuits is changed in response to a scan selection signal.

8 Claims, 6 Drawing Sheets

GATE DRIVING DEVICE AND OPERATING METHOD FOR GATE DRIVING DEVICE

BACKGROUND

Technical Field

The disclosure generally relates to a gate driving device and an operating method for the gate driving device, and more particularly to a gate driving device and an operating method capable of changing a series connection mode between the gate driving circuits in the gate driving device.

Description of Related Art

In general, a gate driving device includes gate driving circuits connected in series. The gate driving circuits generate gate driving signals in sequence in a progressive scanning mode. Based on different display requirement, a scanning mode is not limited to progressive scanning mode. Therefore, how to let the gate driving device have different scanning modes of is one of the research and development focuses of those skilled in the art.

SUMMARY

The disclosure provides a gate driving device and an operating method capable of changing a series connection mode between gate driving circuits in the gate driving device.

The gate driving device of the disclosure includes a plurality of gate driving circuits and a control circuit. The gate driving circuits generate a plurality of gate driving signals having different timing. The gate driving circuits change a series connection mode between the gate driving circuits in response to a scan selection signal. The series connection mode corresponds to a gate driving scanning mode of the gate driving device. The series connection mode corresponds to a gate driving scanning mode of the gate driving device. The control circuit is coupled to a plurality of candidate gate driving circuits among the gate driving circuits. The control circuit selects one of the candidate gate driving circuits as an initial stage gate driving circuit per one scanning cycle.

The operating method of the disclosure is applicable to a gate driving device. The gate driving device comprises a plurality of gate driving circuits generating a plurality of gate driving signals having different timing. The operating method comprises: selecting a plurality of candidate gate driving circuits among the gate driving circuits; selecting one of the candidate gate driving circuits as an initial stage gate driving circuit per one scanning cycle; and changing a series connection mode between the gate driving circuits in response to a scan selection signal, wherein the series connection mode corresponds to a gate driving scanning mode of the gate driving device.

Based on the above, in the disclosure, the gate driving device and the operating method selects one of the candidate gate driving circuits as the initial stage gate driving circuit and changes the series connection mode between the gate driving circuits in response to a scan selection signal. The series connection mode between the gate driving circuits and the initial stage gate driving circuit may be changed. Therefore, the gate driving device operates in different scanning modes.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. Thus, when the terms “include”, “comprise” and/or “have” are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being “coupled to”, “connected to”, or “conducted to” another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
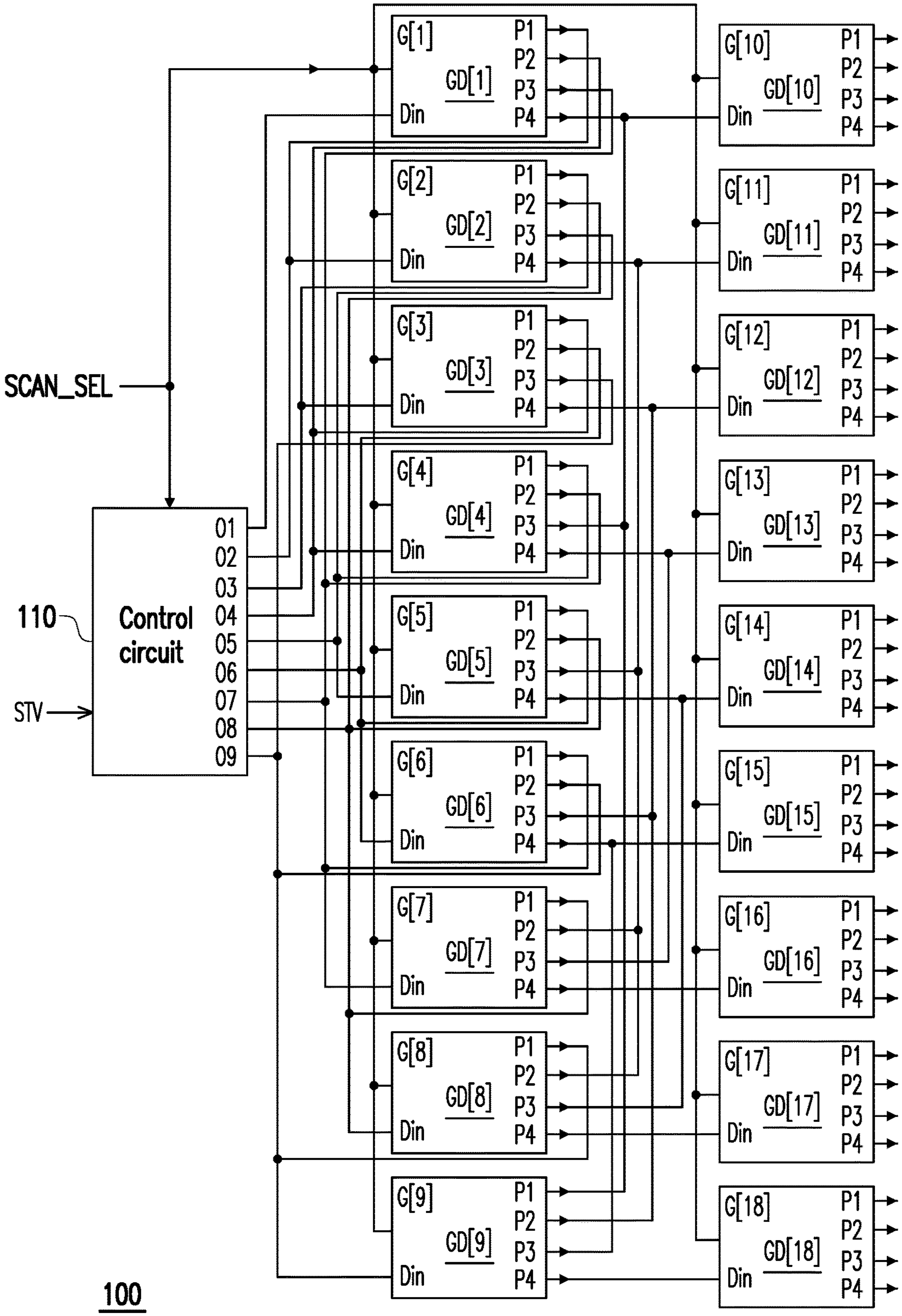
FIG. 1 illustrates a schematic diagram of a gate driving device according to an embodiment of the disclosure.

FIG. 1 illustrates a schematic diagram of a gate driving device according to an embodiment of the disclosure. Referring to FIG. 1, in the embodiment, the gate driving device 100 includes gate driving circuits and a control circuit 110. For the convenience of description, FIG. 1, illustrates the gate driving circuits GD[1] to GD[18] among the gate driving circuits. In the embodiment, the gate driving circuits GD[1] to GD[18] generate gate driving signals G[1] to G[18] having different timing. For example, the gate driving circuits GD[1] generates the gate driving signal G[1]. the gate driving circuits GD[2] generates the gate driving signal G[2], and so on. The gate driving signals G[1] to G[18] have different timing respectively.

In the embodiment, the gate driving circuits GD[1] to GD[18] change a series connection mode between the gate driving circuits GD[1] to GD[18] in response to a scan selection signal SCAN_SEL. The series connection mode corresponds to a gate driving scanning mode of the gate driving device 100. For example, in a progressive scanning mode, the gate driving circuits GD[1] to GD[18] are connected in series in response to a scan selection signal SCAN_SEL having a first value. In an interlace scanning mode, the gate driving circuits GD[1] to GD[18] are connected in interlace in response to a scan selection signal SCAN_SEL having a second value.

In the embodiment, the control circuit 110 is coupled to candidate gate driving circuits among the gate driving circuits GD[1] to GD[18]. In the embodiment, the gate driving circuits are set as GD[1] to GD[9] are candidate gate driving circuits respectively, the disclosure is not limited thereto. The control circuit 110 selects one of the candidate gate driving circuits GD[1] to GD[9] as an initial stage gate driving circuit per one scanning cycle. For example, in the progressive scanning mode, the control circuit 110 selects the candidate gate driving circuit GD[1] (that is, the first stage gate driving circuit) as the initial stage gate driving circuit. In the interlace scanning mode, the control circuit 110 may change the initial stage gate driving circuit per one scanning cycle.

It should be noted, the gate driving selects one of the candidate gate driving circuits GD[1] to GD[9] as the initial stage gate driving circuit and changes the series connection mode between the gate driving circuits in response to the scan selection signal SCAN_SEL. The series connection mode between the gate driving circuits GD[1] to GD[18] and the initial stage gate driving circuit may be changed. Therefore, the gate driving device operates in different scanning modes, such as the progressive scanning mode and the interlace scanning mode.

In the embodiment, the gate driving circuits GD[1] to GD[18] receive the scan selection signal SCAN_SEL. Each of the gate driving circuits GD[1] to GD[18] may select one of other gate driving circuits as a target gate driving circuit and provide a corresponding gate driving signal to an input terminal Din of the target gate driving circuit based on the scan selection signal SCAN_SEL respectively.

In the embodiment, the control circuit 110 has output terminals O1 to O9. The control circuit 110 is connected to the candidate gate driving circuit GD[1] through the output terminal O1. The control circuit 110 is connected to the candidate gate driving circuit GD[2] through the output terminal O2, and so on. The control circuit 110 receives the scan selection signal SCAN_SEL. The control circuit 110 selects one of the candidate gate driving circuits GD[1] to GD[9] as the initial stage gate driving circuit in response to the scan selection signal SCAN_SEL.

In the embodiment, the control circuit 110 may obtain the gate driving scanning mode (such as, the progressive scanning mode or the interlace scanning mode) of the gate driving device 100 based on the scan selection signal SCAN_SEL. For example, the control circuit 110 may select one of the candidate gate driving circuits as the initial stage gate driving circuit in the progressive scanning mode. The control circuit 110 may sequentially change one of the candidate gate driving circuits as the initial stage gate driving circuit.

In the embodiment, the control circuit 110 may receive the scan selection signal SCAN_SEL and the initial signal STV supplied from an external device. In the embodiment, the control circuit 110 may receive the scan selection signal SCAN_SEL generate the initial signal STV in response to the scan selection signal SCAN_SEL.

In the embodiment, the gate driving circuits GD[1] to GD[18] may be implemented as a shift register for any type of a digital display panel, such as LCD display panel or LED display panel. The gate driving circuits GD[1] to GD[18] provide the gate driving signals G[1] to G[18] having different timing to different pixel rows/columns of the digital display panel through different scan lines respectively.

In the embodiment, the control circuit 110 may be a central processing unit (CPU) or other programmable general-purpose or specific-purpose microprocessor, digital signal processor (DSP), programmable controller, application specific integrated circuit (ASIC), programmable logic device (PLD), other similar devices, or a combination thereof. The control circuit 110 is capable of loading and executing a computer program to complete a corresponding operational function. In an embodiment, the control circuit 110 may also achieve various operational functions through implementation of hardware circuits, and sufficient teaching, suggestions, and implementation details about the detailed steps and implementation are already provided in the common knowledge of the field.

Figure 2:
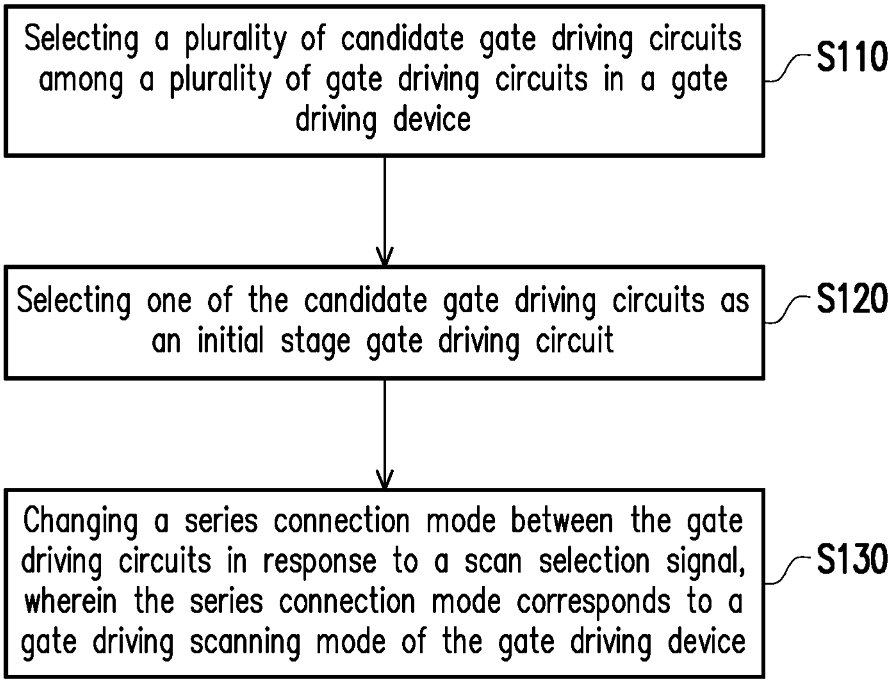
FIG. 2 illustrates a schematic diagram of an operating method according to an embodiment of the disclosure.

FIG. 2 illustrates a schematic diagram of an operating method according to an embodiment of the disclosure. Referring to FIG. 1 and FIG. 2, the operating method is applicable to the gate driving device 100. In the embodiment, at step S110, the control circuit 110 selects the candidate gate driving circuits GD[1] to GD[9] among the gate driving circuits GD[1] to GD[18]. At step S120, the control circuit 110 selects one of the candidate gate driving circuits GD[1] to GD[9] as the initial stage gate driving circuit. At step S130, the gate driving circuits GD[1] to GD[18] change a series connection mode between the gate driving circuits GD[1] to GD[18] in response to the scan selection signal SCAN_SEL. The series connection mode corresponds to a gate driving scanning mode of the gate driving device 100. The implementation details of the steps S110 to S130 may be sufficiently taught in the embodiment in FIG. 1 and are not repeated herein.

In some embodiments, the step S130 may prior to the steps S110.

Figure 3:
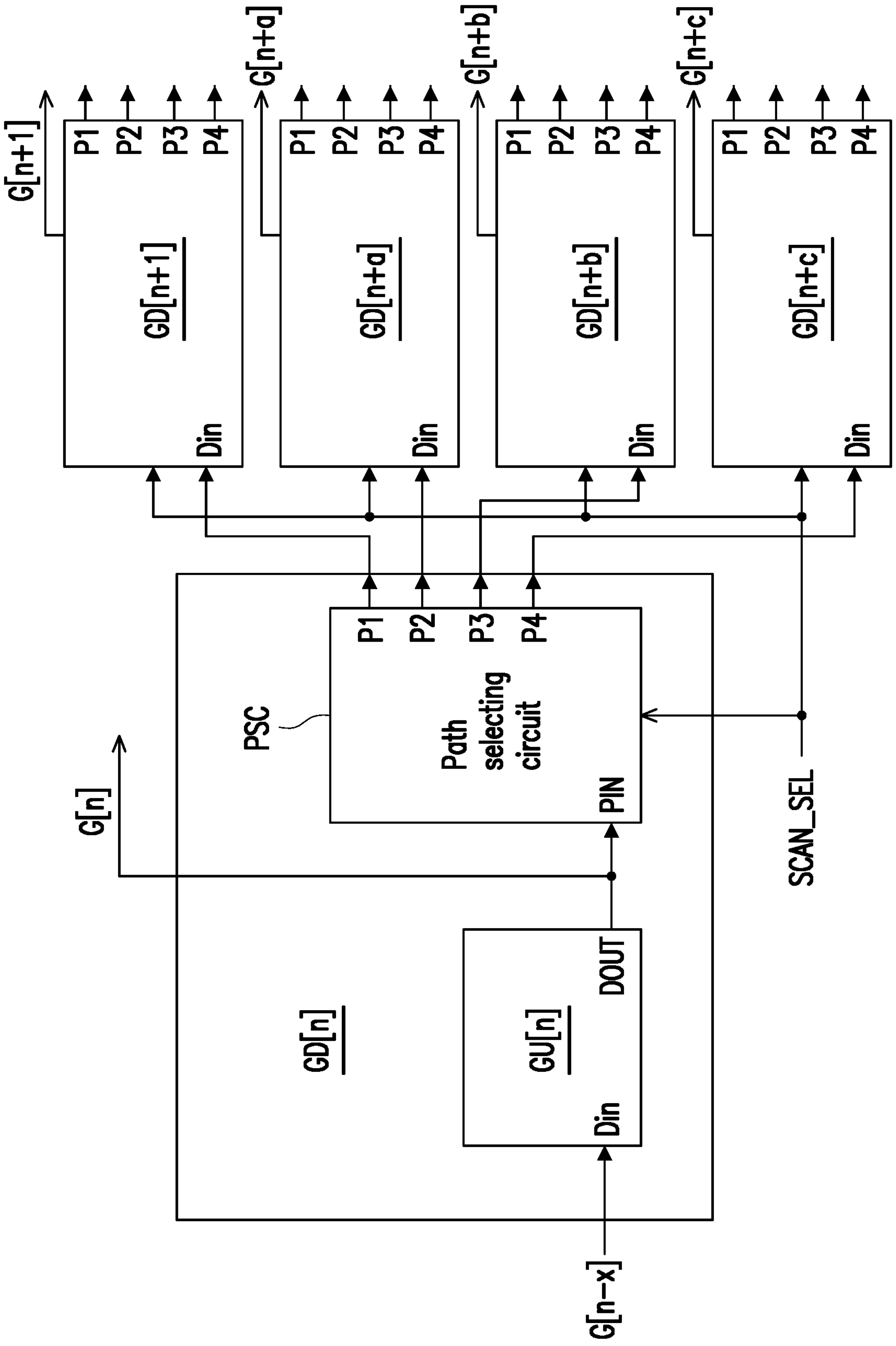
FIG. 3 illustrates a schematic diagram of a gate driving circuit according to an embodiment of the disclosure.

FIG. 3 illustrates a schematic diagram of a gate driving circuit according to an embodiment of the disclosure. Referring to FIG. 3, the gate driving circuit GD[n] (that is, the "n"th stage gate driving circuit) includes a gate driving unit GU[n] and a path selecting circuit PSC. The gate driving unit GU[n] receives an input gate driving signal G[n−x] from one of other gate driving circuits through an input terminal Din of the gate driving unit GU[n]. The gate driving unit GU[n] generates a gate driving signal G[n] (that is, an output gate driving signal) through an output terminal DOUT of the gate driving circuit GD[n] according to the input gate driving signal G[n−x]. In the embodiment, a timing of the output gate driving G[n−x] signal lag behind a timing of the input gate driving signal G[n].

In the embodiment, the path selecting circuit PSC is coupled to the gate driving unit GU[n]. The path selecting circuit PSC connects an output terminal DOUT of the gate driving unit GU[n] to a target gate driving circuit (for example, "n+x"th stage gate driving circuit GD[n+x]) in response to the scan selection signal SCAN_SEL. The value "x" is decided by a digital value of the scan selection signal SCAN_SEL.

For example, the scan selection signal SCAN_SEL is a digital data having a two-bit digital value, the disclosure is not limited thereto. The path selecting circuit PSC connects an output terminal DOUT of the gate driving unit GU[n] to a gate driving circuit GD[n+1] when the digital value of the scan selection signal SCAN_SEL is "00". The path selecting circuit PSC connects an output terminal DOUT of the gate driving unit GU[n] to a gate driving circuit GD[n+a] (that is, "n+a"th stage gate driving circuit) when the digital value of the scan selection signal SCAN_SEL is "01". The path selecting circuit PSC connects an output terminal DOUT of the gate driving unit GU[n] to a gate driving circuit GD[n+b] (that is, "n+b"th stage gate driving circuit) when the digital value of the scan selection signal SCAN_SEL is "10". The path selecting circuit PSC connects an output terminal DOUT of the gate driving unit GU[n] to a gate driving circuit GD[n+c] (that is, "n+c"th stage gate driving circuit) when the digital value of the scan selection signal SCAN_SEL is "11". The values "a", "b" and "c" are different positive integers greater than 1, respectively. For example, the value "a" is "3"; the value "b" is "6"; the value "c" is "9", the disclosure is not limited thereto.

For example, an input terminal PIN of the path selecting circuit PSC is connected to the output terminal DOUT of the gate driving unit GU[n]. A connecting terminal P1 of the path selecting circuit PSC is connected to an input terminal Din of the gate driving circuit GD[n+1]. A connecting terminal P2 of the path selecting circuit PSC is connected to an input terminal Din of the gate driving circuit GD[n+a]. A connecting terminal P3 of the path selecting circuit PSC is connected to an input terminal Din of the gate driving circuit GD[n+b]. A connecting terminal P4 of the path selecting circuit PSC is connected to the connecting terminal P1 is connected to an input terminal Din of the gate driving circuit GD[n+c]. The path selecting circuit PSC connects the input terminal PIN and the connecting terminal P1 when the digital value of the scan selection signal SCAN_SEL is "00". The path selecting circuit PSC connects the input terminal PIN and the connecting terminal P2 when the digital value of the scan selection signal SCAN_SEL is "01". The path selecting circuit PSC connects the input terminal PIN and the connecting terminal P3 when the digital value of scan selection signal SCAN_SEL is "10". The path selecting circuit PSC connects the input terminal PIN and the connecting terminal P4 when the digital value of the scan selection signal SCAN_SEL is "11".

In the embodiment, the gate driving circuits GD[n] to GD[n+c] receive the scan selection signal SCAN_SEL. Therefore, if the gate driving circuit GD[n] is connected to the gate driving circuit GD[n+1], the gate driving circuit GD[n] receives gate driving signals G[n−1]. If the gate driving circuit GD[n] is connected to the gate driving circuit GD[n+a], the gate driving circuit GD[n] receives gate driving signals G[n−a], and so on.

Figure 4:
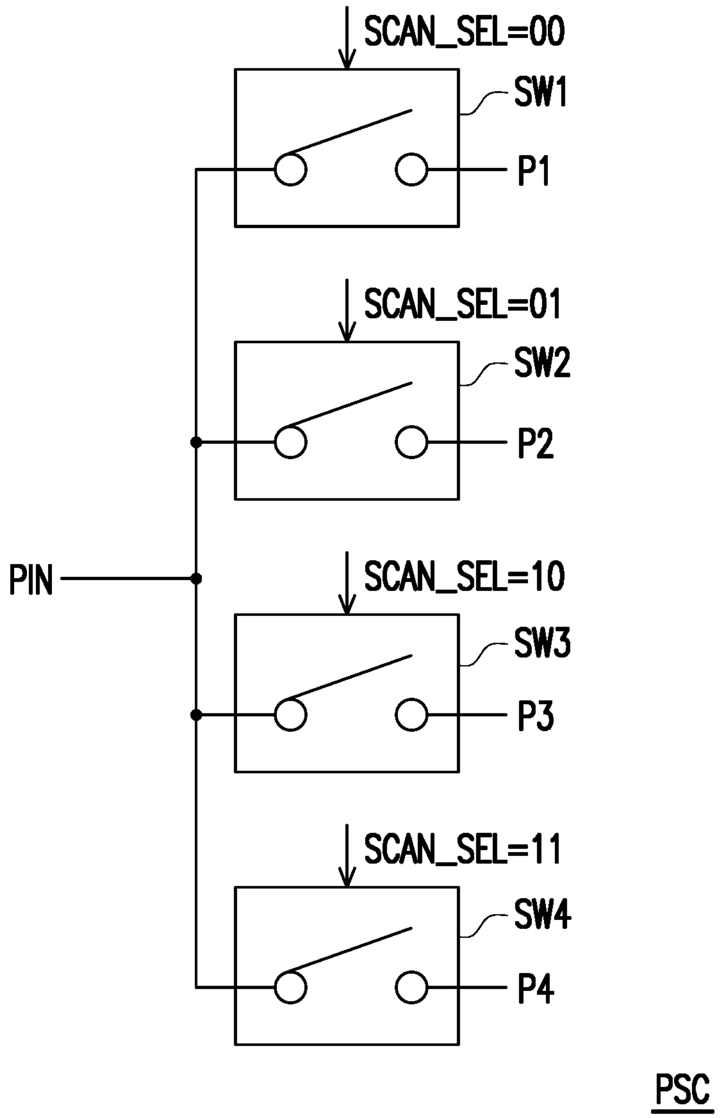
FIG. 4 illustrates a schematic diagram of a path selecting circuit according to an embodiment of the disclosure.

FIG. 4 illustrates a schematic diagram of a path selecting circuit according to an embodiment of the disclosure. Referring to FIG. 3 and FIG. 4, the path selecting circuit PSC includes switches SW1 to SW4. In the embodiment, a first terminal of the switch SW1 is connected to the output terminal of the gate driving circuit GD[n] through the input terminal PIN. A second terminal of the switch SW1 is connected to the input terminal Din of the gate driving circuit GD[n+1] through the connecting terminal P1. The switch SW1 is turned-on in response to the scan selection signal SCAN_SEL having the digital value "00". A first terminal of the switch SW2 is connected to the output terminal of the gate driving circuit GD[n] through the input terminal PIN. A second terminal of the switch SW2 is connected to the input terminal Din of the gate driving circuit GD[n+a] through the connecting terminal P2. The switch SW2 is turned-on in response to the scan selection signal SCAN_SEL having the digital value "01". A first terminal of the switch SW3 is connected to the output terminal of the gate driving circuit GD[n] through the input terminal PIN. A second terminal of the switch SW3 is connected to the input terminal Din of the gate driving circuit GD[n+b] through the connecting terminal P3. The switch SW2 is turned-on in response to the scan selection signal SCAN_SEL having the digital value "10". A first terminal of the switch SW4 is connected to the output terminal of the gate driving circuit GD[n] through the input terminal PIN. A second terminal of the switch SW4 is connected to the input terminal Din of the gate driving circuit GD[n+c] through the connecting terminal P4. The switch SW4 is turned-on in response to the scan selection signal SCAN_SEL having the digital value "11".

Figure 5A:
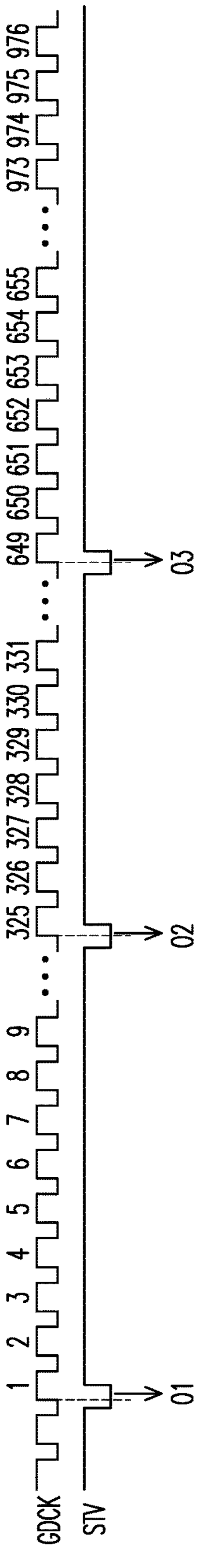
FIG. 5A illustrates a timing diagram for a 3-cycle interlace scanning mode according to an embodiment of the disclosure.

FIG. 5A illustrates a timing diagram for a 3-cycle interlace scanning mode according to an embodiment of the disclosure. Referring to FIG. 1 and FIG. 5A, FIG. 5A illustrates timing diagrams of the initial signal STV and a gate driving clock GDCK. In the embodiment, the 3-cycle interlace scanning mode is applicable to the gate driving device 100 having 972 gate driving channels. In other words, the gate driving device 100 includes 972 gate driving circuits GD[1] to GD[972]. In the 3-cycle interlace scanning mode, the gate driving device 100 performs the interlace scanning operations in three cycles. In the 3-cycle interlace scanning mode, the control circuit 110 selects the gate driving circuits GD[1], GD[2] and GD[3] as the initial stage gate driving circuit for different cycle interlace scanning operations.

In the embodiment, when the initial signal STV has a first pulse (for example, a first negative pulse, the disclosure is not limited thereto) at a pulse "1" of the gate driving clock GDCK, the gate driving device 100 outputs the initial signal STV to the gate driving circuit GD[1] through the output terminal O1 and starts to perform a first cycle interlace scanning operation. Therefore, the gate driving signal G[1] has a positive pulse at a pulse "2" of the gate driving clock GDCK. The gate driving signal G[4] has a positive pulse at a pulse "3" of the gate driving clock GDCK. The gate driving signal G[7] has a positive pulse at a pulse "4" of the gate driving clock GDCK, and so on.

When the initial signal STV has a second pulse at a pulse "325" of the gate driving clock GDCK, the gate driving device 100 outputs the initial signal STV to the gate driving circuit GD[2] through the output terminal O2 and starts a second cycle interlace scanning operation. Therefore, the gate driving signal G[2] has a positive pulse at a pulse "326" of the gate driving clock GDCK. The gate driving signal G[5] has a positive pulse at a pulse "327" of the gate driving clock GDCK. The gate driving signal G[8] has a positive pulse at a pulse "328" of the gate driving clock GDCK, and so on.

When the initial signal STV has a third pulse at a pulse "649" of the gate driving clock GDCK, the gate driving device 100 outputs the initial signal STV through the output terminal O3 and starts a third cycle interlace scanning operation. Therefore, the gate driving signal G[3] has a positive pulse at a pulse "650" of the gate driving clock GDCK. The gate driving signal G[6] has a positive pulse at a pulse "651" of the gate driving clock GDCK. The gate driving signal G[9] has a positive pulse at a pulse "652" of the gate driving clock GDCK, and so on.

Figure 5B:
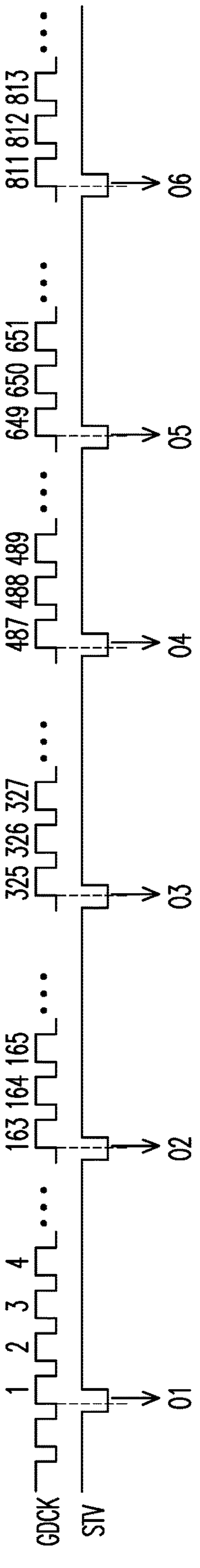
FIG. 5B illustrates a timing diagram for a 6-cycle interlace scanning mode according to an embodiment of the disclosure.

FIG. 5B illustrates a timing diagram for a 6-cycle interlace scanning mode according to an embodiment of the disclosure. Referring to FIG. 1 and FIG. 5B, FIG. 5B illustrates timing diagrams of the initial signal STV and a gate driving clock GDCK. In the embodiment, the 6-cycle interlace scanning mode is applicable to the gate driving device 100 having the gate driving channels GD[1] to GD[972]. In other words, the gate driving device 100 includes 972 gate driving circuits. In the 6-cycle interlace scanning mode, the gate driving device 100 performs the interlace scanning operations in six cycles. In the 6-cycle interlace scanning mode, the control circuit 110 selects the gate driving circuits GD[1] to GD[6] as the initial stage gate driving circuit for different cycle interlace scanning operations.

In the embodiment, when the initial signal STV has a first pulse at a pulse "1" of the gate driving clock GDCK, the gate driving device 100 outputs the initial signal STV to the gate driving circuit GD[1] through the output terminal O1 and starts to perform a first cycle interlace scanning operation. Therefore, the gate driving signal G[1] has a positive pulse at a pulse "2" of the gate driving clock GDCK. The gate driving signal G[7] has a positive pulse at a pulse "3" of the gate driving clock GDCK. The gate driving signal G[13] has a positive pulse at a pulse "4" of the gate driving clock GDCK, and so on.

When the initial signal STV has a second pulse at a pulse "163" of the gate driving clock GDCK, the gate driving device 100 outputs the initial signal STV to the gate driving circuit GD[2] through the output terminal O2 and starts a second cycle interlace scanning operation. Therefore, the gate driving signal G[2] has a positive pulse at a pulse "164" of the gate driving clock GDCK. The gate driving signal G[8] has a positive pulse at a pulse "165" of the gate driving clock GDCK, and so on.

When the initial signal STV has a third pulse at a pulse "325" of the gate driving clock GDCK, the gate driving device 100 outputs the initial signal STV to the gate driving circuit GD[3] through the output terminal O3 and starts a third cycle interlace scanning operation. Therefore, the gate driving signal G[3] has a positive pulse at a pulse "326" of the gate driving clock GDCK. The gate driving signal G[9] has a positive pulse at a pulse "327" of the gate driving clock GDCK, and so on.

When the initial signal STV has a fourth pulse at a pulse "487" of the gate driving clock GDCK, the gate driving device 100 outputs the initial signal STV to the gate driving circuit GD[4] through the output terminal O4 and starts a fourth cycle interlace scanning operation. Therefore, the gate driving signal G[4] has a positive pulse at a pulse "488" of the gate driving clock GDCK. The gate driving signal G[10] has a positive pulse at a pulse "489" of the gate driving clock GDCK, and so on.

When the initial signal STV has a fifth pulse at a pulse "649" of the gate driving clock GDCK, the gate driving device 100 outputs the initial signal STV to the gate driving circuit GD[5] through the output terminal O5 and starts a fifth cycle interlace scanning operation. Therefore, the gate driving signal G[5] has a positive pulse at a pulse "650" of the gate driving clock GDCK. The gate driving signal G[11] has a positive pulse at a pulse "651" of the gate driving clock GDCK, and so on.

When the initial signal STV has a sixth pulse at a pulse "811" of the gate driving clock GDCK, the gate driving device 100 outputs the initial signal STV to the gate driving circuit GD[6] through the output terminal O6 and starts a sixth cycle interlace scanning operation. Therefore, the gate driving signal G[6] has a positive pulse at a pulse "812" of the gate driving clock GDCK. The gate driving signal G[12] has a positive pulse at a pulse "813" of the gate driving clock GDCK, and so on.

Figure 5C:
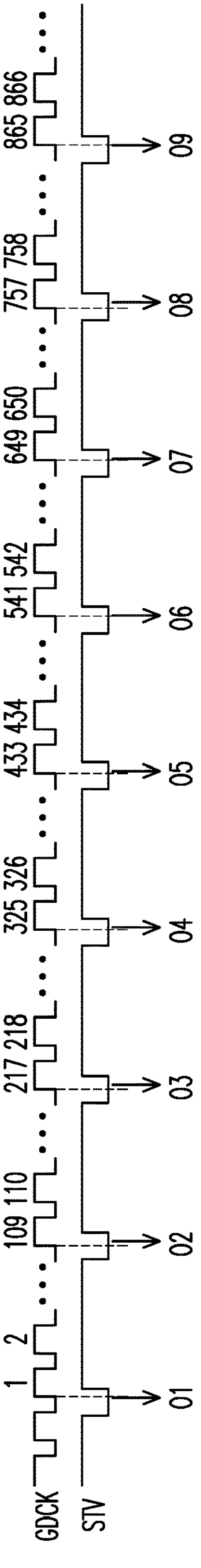
FIG. 5C illustrates a timing diagram for a 9-cycle interlace scanning mode according to an embodiment of the disclosure.

FIG. 5C illustrates a timing diagram for a 9-cycle interlace scanning mode according to an embodiment of the disclosure. Referring to FIG. 1 and FIG. 5C, FIG. 5C illustrates timing diagrams of the initial signal STV and a gate driving clock GDCK. In the embodiment, the 9-cycle interlace scanning mode is applicable to the gate driving device 100 having the gate driving channels GD[1] to GD[972]. In other words, the gate driving device 100 includes 972 gate driving circuits. In the 9-cycle interlace scanning mode, the gate driving device 100 performs the interlace scanning operations in nine cycles. In the 9-cycle interlace scanning mode, the control circuit 110 selects the gate driving circuits GD[1] to GD[9] as the initial stage gate driving circuit for different cycle interlace scanning operations.

In the embodiment, when the initial signal STV has a first pulse at a pulse "1" of the gate driving clock GDCK, the gate driving device 100 outputs the initial signal STV to the gate driving circuit GD[1] through the output terminal O1 and starts to perform a first cycle interlace scanning operation. Therefore, the gate driving signal G[1] has a positive pulse at a pulse "2" of the gate driving clock GDCK. The gate driving signal G[10] has a positive pulse at a pulse "3" of the gate driving clock GDCK, and so on.

When the initial signal STV has a second pulse at a pulse "109" of the gate driving clock GDCK, the gate driving device 100 outputs the initial signal STV to the gate driving circuit GD[2] through the output terminal O2 and starts a second cycle interlace scanning operation. Therefore, the gate driving signal G[2] has a positive pulse at a pulse "164" of the gate driving clock GDCK. The gate driving signal G[11] has a positive pulse at a next pulse, and so on.

When the initial signal STV has a third pulse at a pulse "217" of the gate driving clock GDCK, the gate driving device 100 outputs the initial signal STV to the gate driving circuit GD[3] through the output terminal O3 and starts a third cycle interlace scanning operation. Therefore, the gate driving signal G[3] has a positive pulse at a pulse "218" of the gate driving clock GDCK. The gate driving signal G[12] has a positive pulse at a next pulse, and so on.

When the initial signal STV has a fourth pulse at a pulse "325" of the gate driving clock GDCK, the gate driving device 100 outputs the initial signal STV to the gate driving circuit GD[4] through the output terminal O4 and starts a fourth cycle interlace scanning operation. Therefore, the gate driving signal G[4] has a positive pulse at a pulse "326" of the gate driving clock GDCK. The gate driving signal G[13] has a positive pulse at a next pulse, and so on.

When the initial signal STV has a fifth pulse at a pulse "433" of the gate driving clock GDCK, the gate driving device 100 outputs the initial signal STV to the gate driving circuit GD[5] through the output terminal O5 and starts a fifth cycle interlace scanning operation. Therefore, the gate driving signal G[5] has a positive pulse at a pulse "434" of the gate driving clock GDCK. The gate driving signal G[14] has a positive pulse at a next pulse, and so on.

When the initial signal STV has a sixth pulse at a pulse "541" of the gate driving clock GDCK, the gate driving device 100 outputs the initial signal STV to the gate driving circuit GD[6] through the output terminal O6 and starts a sixth cycle interlace scanning operation. Therefore, the gate driving signal G[6] has a positive pulse at a pulse "542" of the gate driving clock GDCK. The gate driving signal G[15] has a positive pulse at a next pulse, and so on.

When the initial signal STV has a seventh pulse at a pulse "649" of the gate driving clock GDCK, the gate driving device 100 outputs the initial signal STV to the gate driving circuit GD[7] through the output terminal O7 and starts a seventh cycle interlace scanning operation. Therefore, the gate driving signal G[7] has a positive pulse at a pulse "650" of the gate driving clock GDCK. The gate driving signal G[16] has a positive pulse at a next pulse, and so on.

When the initial signal STV has an eighth pulse at a pulse "757" of the gate driving clock GDCK, the gate driving device 100 outputs the initial signal STV to the gate driving circuit GD[8] through the output terminal O8 and starts an eighth cycle interlace scanning operation. Therefore, the gate driving signal G[8] has a positive pulse at a pulse "758" of the gate driving clock GDCK. The gate driving signal G[17] has a positive pulse at a next pulse, and so on.

When the initial signal STV has a ninth pulse at a pulse "865" of the gate driving clock GDCK, the gate driving device 100 outputs the initial signal STV to the gate driving circuit GD[9] through the output terminal O9 and starts an ninth cycle interlace scanning operation. Therefore, the gate driving signal G[9] has a positive pulse at a pulse "866" of the gate driving clock GDCK. The gate driving signal G[18] has a positive pulse at a next pulse, and so on.

Figure 6:
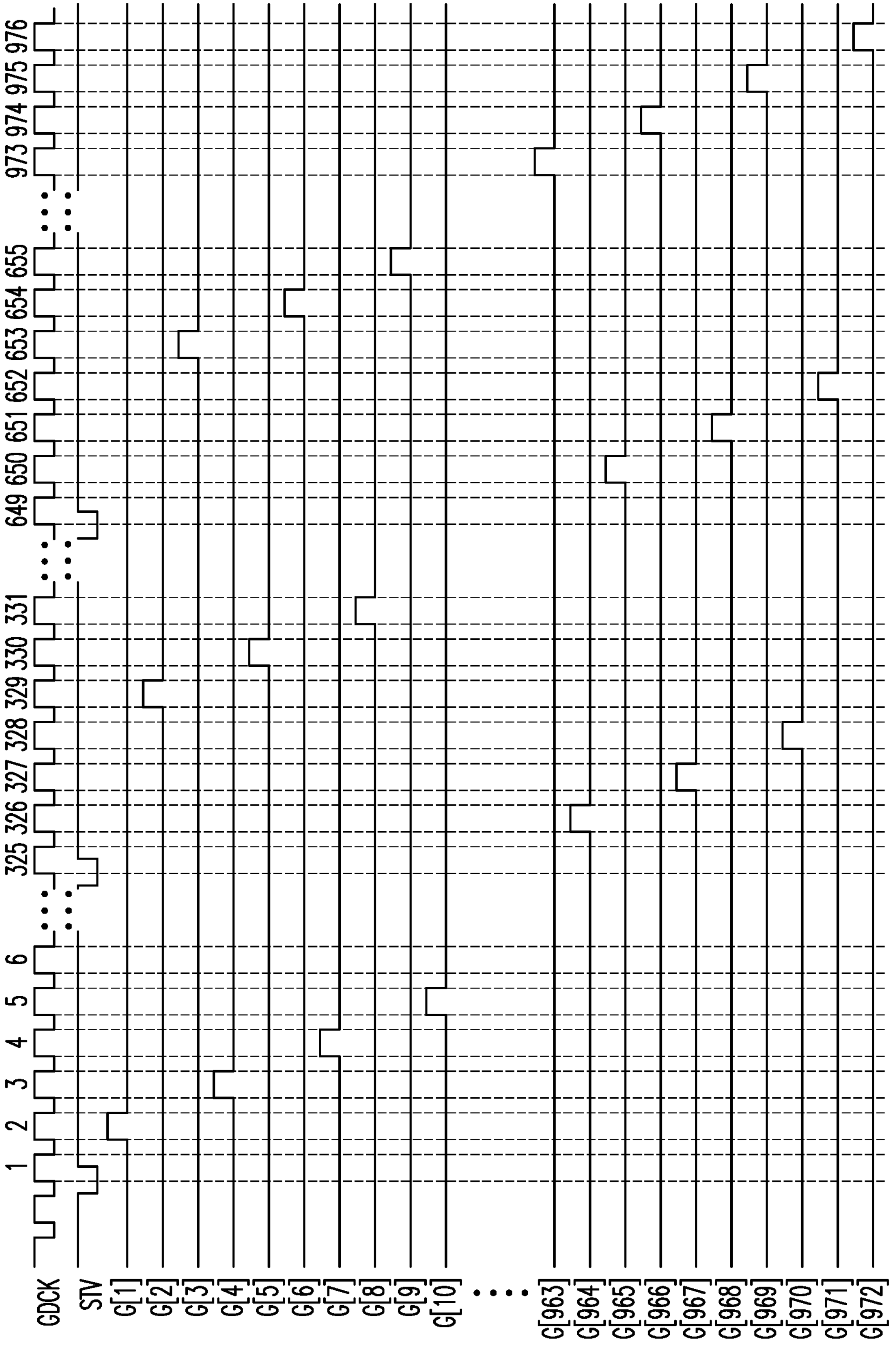
FIG. 6 illustrates a timing diagram for a 3-cycle interlace scanning mode according to an embodiment of the disclosure.

FIG. 6 illustrates a timing diagram for a 3-cycle interlace scanning mode according to an embodiment of the disclosure. Referring to FIG. 1 and FIG. 6, FIG. 6 illustrates timing diagrams of the initial signal STV and a gate driving clock GDCK. In the embodiment, the 3-cycle interlace scanning mode is applicable to the gate driving device 100 having 972 gate driving channels. In other words, the gate driving device 100 includes 972 gate driving circuits. In the 3-cycle interlace scanning mode, the gate driving device 100 performs the interlace scanning operations in three cycles.

In the embodiment, when the initial signal STV has a first pulse (for example, a first negative pulse, the disclosure is not limited thereto) at a pulse "1" of the gate driving clock GDCK, the gate driving device 100 starts to perform a first cycle interlace scanning operation. Therefore, the gate driving signal G[1] has a positive pulse at a pulse "2" of the gate driving clock GDCK. The gate driving signal G[4] has a positive pulse at a pulse "3" of the gate driving clock GDCK. The gate driving signal G[7] has a positive pulse at a pulse "4" of the gate driving clock GDCK, and so on. In the first cycle interlace scanning mode, the control circuit 110 selects the gate driving circuits GD[1] as the initial stage gate driving circuit.

When the initial signal STV has a second pulse at a pulse "325" of the gate driving clock GDCK, the gate driving device 100 starts a second cycle interlace scanning operation. Therefore, the gate driving signal G[964] has a positive pulse at a pulse "326" of the gate driving clock GDCK. The gate driving signal G[967] has a positive pulse at a pulse "327" of the gate driving clock GDCK. The gate driving signal G[970] has a positive pulse at a pulse "328" of the gate driving clock GDCK. The gate driving signal G[2] has a positive pulse at a pulse "329" of the gate driving clock GDCK, and so on. In the second cycle interlace scanning mode, the control circuit 110 selects the gate driving circuits GD[964] as the initial stage gate driving circuit.

When the initial signal STV has a third pulse at a pulse "649" of the gate driving clock GDCK, the gate driving device 100 starts a third cycle interlace scanning operation. Therefore, the gate driving signal G[965] has a positive pulse at a pulse "650" of the gate driving clock GDCK. The gate driving signal G[968] has a positive pulse at a pulse "651" of the gate driving clock GDCK. The gate driving signal G[971] has a positive pulse at a pulse "652" of the gate driving clock GDCK. The gate driving signal G[3] has a positive pulse at a pulse "653" of the gate driving clock GDCK, and so on. In the third cycle interlace scanning mode, the control circuit 110 selects the gate driving circuits GD[965] as the initial stage gate driving circuit. In the third cycle interlace scanning mode, the control circuit 110 selects the gate driving circuits GD[965] as the initial stage gate driving circuit.

In the interlace scanning mode, the control circuit 110 selects the gate driving circuits GD[1], GD[964] and GD[965] as the initial stage gate driving circuit for different cycle interlace scanning operations.

In summary, the gate driving device and the operating method selects one of the candidate gate driving circuits as the initial stage gate driving circuit and changes the series connection mode between the gate driving circuits in response to a scan selection signal. The series connection mode between the gate driving circuits and the initial stage gate driving circuit may be changed. Therefore, the gate driving device operates in different scanning modes, such as the progressive scanning mode and the interlace scanning mode.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A gate driving device, comprising:

a plurality of gate driving circuits, configured to generate a plurality of gate driving signals having different timing and change a series connection mode between the plurality of gate driving circuits in response to a scan selection signal, wherein the series connection mode corresponds to a gate driving scanning mode of the gate driving device; and a control circuit, coupled to a plurality of candidate gate driving circuits among the plurality of gate driving circuits, configured to select one of the plurality of candidate gate driving circuits as an initial stage gate driving circuit per one scanning cycle, wherein the scan selection signal having different digital values corresponds to different one among a plurality of interlace scanning modes, wherein in the plurality of interlace scanning modes, a plurality of gate driving circuits that are not adjacent to each other among the gate driving circuits generate a plurality of gate driving signals having a pulse sequentially, wherein the scan selection signal having a first digital value corresponds to a first interlace scanning mode among a plurality of interlace scanning modes, wherein the scan selection signal having a second digital value corresponds to a second interlace scanning mode among the plurality of interlace scanning modes, wherein a "n"th stage gate driving circuit among the plurality of gate driving circuits comprises:

a gate driving unit, configured to receive an input gate driving signal from one of other gate driving circuits and generate an output gate driving signal according to the input gate driving signal, wherein a timing of the output gate driving signal lags behind a timing of the input gate driving signal; and a path selecting circuit, comprises:

a first switch, wherein a first terminal of the first switch is connected to the output terminal of the "n"th stage gate driving circuit and a second terminal of the first switch is connected to an input terminal of a "n+a" th stage gate driving circuit, and wherein the first switch is turned-on in response to the scan selection signal having the first digital value, wherein in the first interlace scanning mode, the first switch is turned on and transmits the output gate driving signal to the "n+a" th stage gate driving circuit; and a second switch, wherein a first terminal of the second switch is connected to the output terminal of the "n"th stage gate driving circuit and a second terminal of the second switch is connected to an input terminal of a "n+b" th stage gate driving circuit, and wherein the second switch is turned-on in response to the scan selection signal having the second digital value different from the first digital value, wherein in the second interlace scanning mode, the second switch is turned on and transmits the output gate driving signal to the "n+b" th stage gate driving circuit, wherein the "a" and "b" are positive integers, and wherein when the series connection mode corresponds to the interlace scanning modes of the gate driving device, the control circuit changes the selected one of the plurality of candidate gate driving circuits as the initial stage gate driving circuit per one scanning cycle of a plurality of scanning cycles indicated by pulses of an initial signal, and wherein the candidate gate driving circuits respectively operates in the plurality of scanning cycles, and the candidate gate driving circuits generating the gate driving signals in one of the plurality of scanning cycles are different from the candidate gate driving circuits generating the gate driving signals in another of the plurality of scanning cycles.

2. The gate driving device of claim 1, wherein the control circuit receives the scan selection signal, and selects one of the plurality of candidate gate driving circuits as the initial stage gate driving circuit in response to the scan selection signal.

3. The gate driving device of claim 2, wherein the control circuit inputs the initial signal of the gate driving device to the initial stage gate driving circuit in response to the scan selection signal.

4. The gate driving device of claim 1, wherein when the series connection mode corresponds to a progressive scanning mode of the gate driving device, the control circuit selects a first stage gate driving circuit among the plurality of candidate gate driving circuits as the initial stage gate driving circuit.

5. An operating method for a gate driving device, wherein the gate driving device comprises a plurality of gate driving circuits generating a plurality of gate driving signals having different timing, wherein the operating method comprises:

selecting a plurality of candidate gate driving circuits among the plurality of gate driving circuits;

selecting one of the plurality of candidate gate driving circuits as an initial stage gate driving circuit per one scanning cycle; and changing a series connection mode between the plurality of gate driving circuits in response to a scan selection signal, wherein the series connection mode corresponds to a gate driving scanning mode of the gate driving device, wherein the scan selection signal having different digital values corresponds to different one among a plurality of interlace scanning modes, wherein in the plurality of interlace scanning modes, a plurality of gate driving circuits that are not adjacent to each other among the gate driving circuits generate a plurality of gate driving signals having a pulse sequentially, wherein the scan selection signal having a first digital value corresponds to a first interlace scanning mode among the plurality of interlace scanning modes, wherein the scan selection signal having a second digital value corresponds to a second interlace scanning mode among the plurality of interlace scanning modes, wherein a "n"th stage gate driving circuit among the plurality of gate driving circuits comprises:

a gate driving unit, configured to receive an input gate driving signal from one of other gate driving circuits and generate an output gate driving signal according to the input gate driving signal, wherein a timing of the output gate driving signal lags behind a timing of the input gate driving signal; and a path selecting circuit, comprises:

a first switch, wherein a first terminal of the first switch is connected to the output terminal of the "n"th stage gate driving circuit and a second terminal of the first switch is connected to an input terminal of a "n+a" th stage gate driving circuit, and wherein the first switch is turned-on in response to the scan selection signal having the first digital value, wherein in the first interlace scanning mode, the first switch is turned on and transmits the output gate driving signal to the "n+a" th stage gate driving circuit; and a second switch, wherein a first terminal of the second switch is connected to the output terminal of the "n"th stage gate driving circuit and a second terminal of the second switch is connected to an input terminal of a "n+b" th stage gate driving circuit, and wherein the second switch is turned-on in response to the scan selection signal having the second digital value different from the first digital value, wherein in the second interlace scanning mode, the second switch is turned on and transmits the output gate driving signal to the "n+b" th stage gate driving circuit, wherein the "a" and "b" are positive integers, and wherein changing the series connection mode between the plurality of gate driving circuits in response to the scan selection signal comprises:

when the series connection mode corresponds to the interlace scanning modes of the gate driving device, changing the selected one of the plurality of candidate gate driving circuits as the initial stage gate driving circuit per one scanning cycle in response to the scan selection signal of a plurality of scanning cycles, indicated by pulses of an initial signal, in response to the scan selection signal, wherein the candidate gate driving circuits operates in the plurality of scanning cycles, and the candidate gate driving circuits generating the gate driving signals in one of the plurality of scanning cycles are different from the candidate gate driving circuits generating the gate driving signals in another of the plurality of scanning cycles.

6. The operating method of claim 5, wherein selecting one of the plurality of candidate gate driving circuits as the initial stage gate driving circuit comprises:

receiving the scan selection signal; and selecting one of the plurality of candidate gate driving circuits as the initial stage gate driving circuit in response to the scan selection signal.

7. The operating method of claim 6, comprising:

inputting the initial signal of the gate driving device to the initial stage gate driving circuit in response to the scan selection signal.

8. The operating method of claim 5, wherein changing the series connection mode between the plurality of gate driving circuits in response to the scan selection signal comprises:

when the series connection mode corresponds to a progressive scanning mode of the gate driving device, taking a first stage gate driving circuit among the plurality of candidate gate driving circuits as the initial stage gate driving circuit in response to the scan selection signal.

* * * * *